(12) United States Patent
Kashiwagi et al.

(10) Patent No.: US 7,107,012 B2
(45) Date of Patent: Sep. 12, 2006

(54) RADIO BASE STATION FOR WIRELESSLY COMMUNICATING WITH A RADIO TERMINAL

(75) Inventors: Kenji Kashiwagi, Minamiashigara (JP); Takashi Maruyama, Ebina (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 10/801,687

(22) Filed: Mar. 17, 2004

(65) Prior Publication Data

US 2004/0242276 A1    Dec. 2, 2004

(30) Foreign Application Priority Data

Mar. 18, 2003    (JP)    ............................. 2003-074398

(51) Int. Cl.
*H04B 1/00*    (2006.01)
*H04B 15/00*    (2006.01)

(52) U.S. Cl. ................. 455/63.4; 455/63.1; 455/67.13; 455/448; 455/450; 455/501; 455/561; 370/338; 342/350; 342/354; 342/368; 343/777

(58) Field of Classification Search ............... 455/63.1, 455/63.3, 63.4, 67.13, 447–448, 450–453, 455/501, 522, 561, 562.1; 370/318, 338; 343/777, 835, 879; 342/350, 354, 368
See application file for complete search history.

(56) References Cited

U.S. PATENT DOCUMENTS 6,181,955 B1 *   1/2001  Dartois ..................... 455/562.1
6,185,205 B1 *   2/2001  Sharrit et al. ................ 370/389
6,188,913 B1 *   2/2001  Fukagawa et al. ........ 455/562.1
6,498,939 B1 *  12/2002  Thomas .................... 455/562.1
2002/0068612 A1 *  6/2002  Carey et al. ................ 455/562
2002/0114304 A1 *  8/2002  Hur et al. .................... 370/338
2003/0020651 A1 *  1/2003  Crilly et al. ................. 342/378
2003/0048770 A1 *  3/2003  Proctor, Jr. ................. 370/349
2003/0064745 A1 *  4/2003  Benveniste ................. 455/522
2004/0203913 A1 * 10/2004  Ogino et al. ............. 455/456.1
2004/0204113 A1 * 10/2004  Kisigami et al. ........ 455/562.1

FOREIGN PATENT DOCUMENTS

JP    2002-217918    8/2002

* cited by examiner

*Primary Examiner*—Steve M. D'Agosta
(74) *Attorney, Agent, or Firm*—Antonelli, Terry, Stout and Kraus, LLP.

(57) ABSTRACT

A radio antenna of a radio base station is a directional antenna. The antenna searches for a peripheral radio base station by changing the directivity of the antenna. An operating channel and electric field intensity of the other base station are acquired by the searching and then stored as positional information. The operating channel of the base station, the directivity of the antenna, and a radio wave intensity communication area are set according to the acquired positional information. Further, the positional information is transmitted and received to and from the other base station to set the base station. When the base station was moved or when external noise occurred abruptly, channel change and change of a cell shape of the directional antenna are carried out. Consequently, interference between the base stations can be minimized and optimum setting of the channel and communicatable area can be realized.

17 Claims, 9 Drawing Sheets

| | SET INFORMATION | | | STATION | | | | | VARIABLE DIRECTIVITY FUNCTION | CELL SETTING | OTHER CH STATE | PRIORITY |
|---|---|---|---|---|---|---|---|---|---|---|---|---|
| | CH | S/N [dB] | FER [%] | TOTAL NUMBER | 1 | 2 | 3 | 4 | | | | |
| A1 | 1 | 40 | 0.01 | 2 | 2 | 0 | 0 | 0 | WITH | MIDDLE | | 2 |
| A2 | 1 | 30 | 0.02 | 2 | 2 | 0 | 0 | 0 | WITHOUT | — | | 1 |

| | SET INFORMATION | | | STATION | | | | VARIABLE DIRECTIVITY FUNCTION | CELL SETTING | OTHER CH STATE | PRIORITY |
|---|---|---|---|---|---|---|---|---|---|---|---|
| | CH | S/N [dB] | FER [%] | TOTAL NUMBER | 1 | 2 | 3 | 4 | | | |
| A1 | 1 | 40 | 0.04 | 4 | 1 | 1 | 1 | 1 | WITH | LARGE | | 4 |
| A2 | 2 | 30 | 0.06 | 4 | 1 | 1 | 1 | 1 | WITH | LARGE | | 2 |
| A3 | 3 | 40 | 0.03 | 3 | 1 | 1 | 1 | 0 | WITH | MIDDLE | | 5 |
| A4 | 3 | 35 | 0.05 | 4 | 1 | 1 | 1 | 1 | WITH | LARGE | | 3 |
| A5 | 4 | 30 | 0.04 | 4 | 1 | 1 | 1 | 1 | WITH | MIDDLE | | 1 |
| A6 | 1 | 45 | 0.02 | 2 | 1 | 0 | 1 | 0 | WITH | MIDDLE | | 6 |

RADIO BASE STATION FOR WIRELESSLY COMMUNICATING WITH A RADIO TERMINAL

BACKGROUND OF THE INVENTION

The present invention relates to radio base stations and methods for controlling the radio base stations and more particular, to a radio base station which can suppress interference between radio base stations connected to a wired LAN and interference caused by external noise and can enhance the performance of a wireless system, because such radio base stations automatically optimumly set their own communicatable ranges and operating frequencies. The present invention also relates to a method for controlling the radio base stations.

At present, a wireless LAN is arranged generally based on a communication system using a direct spread (DS) system. The DS system is a technique for attaching a code monopolizing a specific frequency band to a signal, spreading and transmitting it. The number of radio terminals wirelessly connectable to a single radio base station is practically about 20. When it is desired to use about 20 or more of the radio terminals, it is required to increase the number of such radio base stations.

In the wireless LAN based on the DS system, the radio base station monopolizes and transmits the specific frequency band. Thus, when a plurality of radio base stations are located in an identical area, a technique for locating the radio base stations so as to avoid interference between the stations is required.

FIG. 16 is a diagram for explaining how to set the operating frequencies of radio base stations in a general radio LAN. In FIG. 16, reference numeral 150 denotes a wired LAN, reference symbols 151A and 151B denote radio base stations, symbols 152A and 152B denote radio terminals, and 153A and 153B denote communicatable areas.

FIG. 16 shows an example of a configuration of a system when having the two radio base stations 151A and 151B connected to a wired LAN 150. As shown in FIG. 16, it is assumed that the radio base stations 151A and 151B have the radio terminals 152A and 152B to be wirelessly connected to the respective radio base stations respectively. When the radio base stations have the respective communicatable areas 153A and 153B, the communicatable area of one of the radio base stations includes the communicatable area of the other. For this reason, there is a chance that radio wave interference may take place between the radio base stations. Thus, for the purpose of avoiding such mutual interference between the radio base stations, it becomes necessary to assign different communication frequencies to the radio base stations.

The technique shown in FIG. 16, for the purpose of avoiding the interference as in the aforementioned case, is to automatically set different operating frequencies for the respective radio base stations. For this reason, each radio base station is arranged so as to keep track of set and quality information of other radio base stations and the number of other radio base stations as viewed from the concerned radio base station, to give priorities to the automatic settings of frequencies, and to optimumly determine set frequencies. Such a technique is effective when a plurality of radio base stations are used in an identical area.

As an example of such radio LAN techniques, a technique disclosed, e.g., in JP-A-2002-217918 is known.

In a radio LAN based on the above technique, in order to effectively use an available or usable frequency band, the frequency of each radio base station is set to a predetermined value, which is called channel. For example, in the case of a 2.4 GHz band radio LAN, a range of 97 MHz between 2.4 GHz and 2.497 GHz is divided into 14 channels as usable frequency ranges. In the case of a 5 GHz band radio LAN, a range of 100 MHz between 5.15 GHz and 5.25 GHz is divided into 4 channels as usable frequency ranges.

In the case of the 2.4 GHz band radio LAN, it has 14 channels as mentioned above. When a plurality of radio base stations are present in a communicatable area, however, it is necessary to set the frequencies or channels of the base stations with a distance spaced by an about 2 channels.

SUMMARY OF THE INVENTION

The radio LAN based on the aforementioned technique has a problem that, even in the case of the 2.4 GHz band or 5 GHz band, the number of usable channels is not sufficiently large and thus it is difficult to install many radio base stations in an identical area.

Even when the method is employed based on the above technique of automatically setting usable different frequencies for the respective radio base stations, it is impossible to set the number of radio base stations installable in the communicatable area of each radio base station larger than the number of channels. And depending on the application location, radio base stations corresponding in number to radio terminals cannot be installed. Further, when many radio base stations are installed, interference takes place between the radio base stations and thus a desired performance cannot be secured.

In the above technique, further, when channels cannot be assigned to the respective radio base stations due to the relationship with other radio base stations, the radio base station has to be moved and installed in another communicatable area. However, since the most suitable location of the radio base station to be moved and installed is unknown, the movement and installation of the base station to the optimum point involves difficulties.

It is therefore an object of the present invention is to provide a radio base station which is one of radio base stations in a radio LAN, can solve the above problems in the prior art, minimize interference between the radio base stations. Even when interference occurs between the radio base station and a radio terminal wirelessly connected thereto, when external noise unexpectedly takes place or when the radio base station moves to another communicatable area; the base station of the present invention can automatically modify the optimum channel settings or cell settings quickly. Another object of the present invention is to provide a method for controlling the radio base stations.

In accordance with an aspect of the present invention, there is provided a radio base station for wirelessly communicating with a radio terminal, which includes a radio communication unit for wirelessly communicating with the radio terminal, and a controller for detecting an intensity of an electric field of another radio base station which is located in a communicatable area of the concerned radio base station and which emits radio waves of a first frequency band. In this aspect, the controller detects the field intensity by changing a directivity of a directional antenna of the concerned radio base station, converting the detected field intensity to a distance, and finding a relative direction of the other base station to the concerned base station and a relative distance of the second base station from the concerned base station. The communicatable area of the concerned radio base station usable in the same frequency band as the first frequency band is set on the basis of the found direction and distance of the other base stations.

In another aspect of the present invention, there is provided a radio base station for wirelessly communicating with a radio terminal, which includes a radio communication unit for wirelessly communicating with the radio terminal, and a control device for detecting an intensity of an electric field of another radio base station which is located in a communicatable area of the concerned radio base station and which emits radio waves of a first frequency band. In this aspect, the controller detects the field intensity by changing a directivity of a directional antenna, converting the detected filed intensity to a distance, and finding a relative direction of the other base station to the concerned base station and a relative distance of the second base station from the concerned base station. Setting of the communicatable area of the concerned radio base station usable in the same frequency band as the first frequency band as well as setting of a communicatable area using a second frequency band different from the first frequency band are carried out on the basis of the found direction and distance of the other base station.

In accordance with a further aspect of the present invention, there is provided a radio base station connected to a wired LAN for wirelessly communicating with a LAN terminal, which includes a wired communication unit connected to the wired LAN, a radio communication unit for wirelessly communicating the LAN terminal, and a controller for detecting an intensity of an electric field of another radio base station which is located in a communicatable area of the concerned radio base station and which emits radio waves of a first frequency band. In this aspect, the controller detects the field intensity by changing a directivity of a directional antenna, converting the detected filed intensity to a distance, and finding a relative direction of the other base station to the concerned base station and a relative distance of the other base station from the concerned base station. Setting of the communicatable area of the concerned radio base station in the same frequency band as the first frequency band is carried out on the basis of the found direction and distance of the other base station.

In accordance with another aspect of the present invention, there is provided a radio base station connected to a wired LAN for wirelessly communicating with a LAN terminal, which includes a wired communication unit connected to the wired LAN, a radio communication unit for wirelessly communicating the LAN terminal, and a controller for detecting an intensity of an electric field of another radio base station which is located in a communicatable area of the concerned radio base station and which emits radio waves of a first frequency band. The controller detects the field intensity by changing a directivity of a directional antenna, converting the detected filed intensity to a distance, and finding a relative direction of the other base station to the concerned base station and a relative distance of the second base station from the concerned base station. Setting of the communicatable area of the concerned radio base station usable in the same frequency band as the first frequency band as well as setting of a communicatable area using a second frequency band different from the first frequency band are carried out on the basis of the found direction and distance of the other base station.

In accordance with a still further aspect of the present invention, there is provided a method for controlling a radio base station having a wired communication unit connected to a wired LAN and a radio communication unit for wirelessly communicating with the LAN terminal, which comprises the steps of detecting whether or not a radio base station emitting radio waves of a first frequency band is present in a radio communicatable area of a radio base station using the radio communication device; in the case of the presence of the radio base station emitting radio waves of the first frequency band, converting a detected intensity of an electric field by changing a directivity of a directional antenna, converting the detected field intensity to a distance, and finding a relative direction of the radio base station of the first frequency band to the concerned radio base station and a relative distance of the first frequency band from the concerned radio base station; finding a communicatable area of the radio base station of the first frequency band on the basis of the detected field intensity; and storing the found relative direction, distance and communicatable area of the radio base station of the first frequency band in a memory of the concerned radio base station.

Other objects, features and advantages of the invention will become apparent from the following description of the embodiments of the invention taken in conjunction with the accompanying drawings.

DESCRIPTION OF THE EMBODIMENTS

A radio base station in a radio LAN and a method for controlling the radio base station in accordance with an embodiment of the present invention will be explained in detail with reference to the accompanying drawings.

Figure 1:
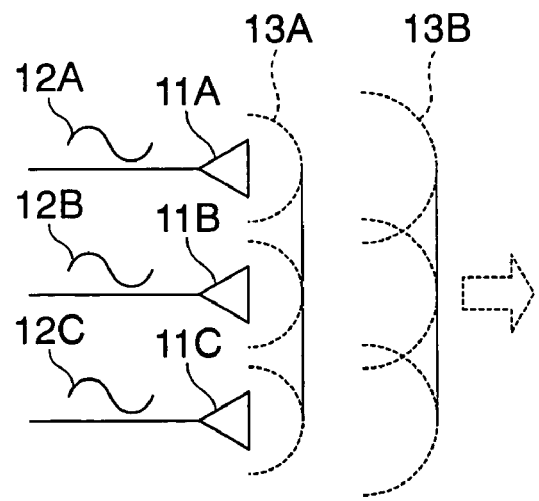
FIG. 1 is a diagram for explaining directional antennas used in a radio base station in the present invention.
Figure 2:
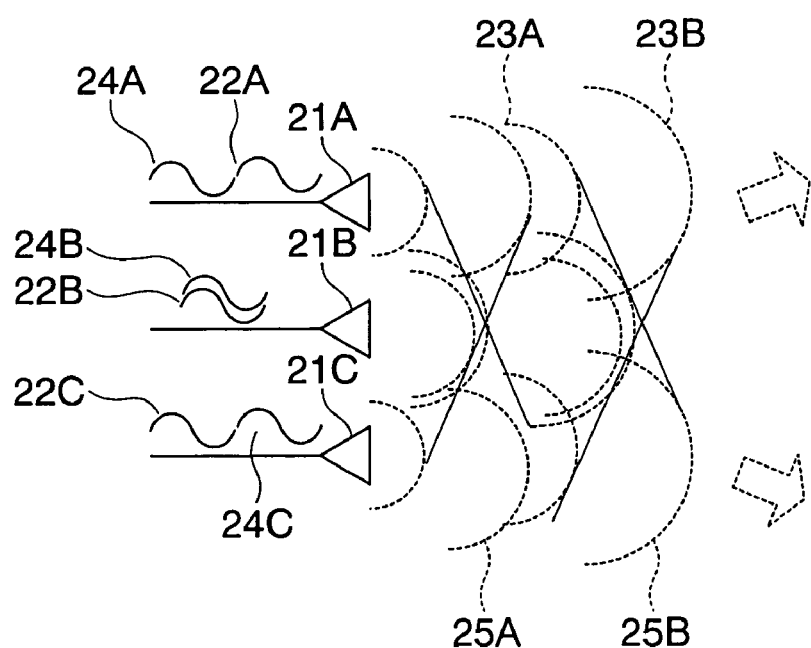
FIG. 2 is another diagram for explaining directional antennas used in a radio base station in the present invention.

FIGS. 1 and 2 are diagrams for explaining directional antennas used in a radio base station in accordance with an embodiment of the present invention. In FIGS. 1 and 2, reference symbols 11A to 11C denote antennas, symbols 12A–12C, 22A–22C, and 24A–24C denote radio waves supplied to the respective antennas, 13A, 13B, 23A, 23B, 25A and 25B denote wave fronts radiated radio waves.

When it is desired for an antenna to have a directivity, it is a common practice to use a plurality of antennas at the same time. In the example of FIG. 1, the antennas 11A, 11B and 11C are arranged with an equal spacing therebetween, and the radio waves 12A, 12B and 12C are supplied in phase to the antennas. When the in-phase radio waves 12A, 12B and 12C are radiated from the antennas into the air, plane waves 13A and 13B propagating rectilinearly. This is because radio waves emitted from the respective antennas spread on concentric circles, a combination of wave fronts of the radio waves from adjacent antennas causes formation of a wave front equivalent to a parallel wave, whereby an output having a directivity of propagating rectilinearly can be obtained.

In the example of FIG. 2, antennas arranged similarly to FIG. 1 are provided so that an antenna output has a directivity in a direction different from the direction of FIG. 1. When it is desired for an antenna output to have a directivity, radio waves having different phases are supplied to the antennas 21A, 21B and 21C to obtain a variable directivity. For example, when the radio wave 22A having a most leading phase is supplied to the antenna 21A, having a phase lag against the radio wave 22A is supplied to the antenna 21B, and the radio wave 22C lagging the antenna 21B by a slight phase is supplied to the antenna 22C; plane waves 23A and 23B are formed in a lower right direction shown in FIG. 2. Similarly, when the radio wave 24C having a most leading phase is supplied to the antenna 21C, the radio wave 24B lagging the radio wave 24C by a slight phase is supplied to the antenna 21B, and the radio wave 24A lagging the radio wave 24B by a slight phase is supplied to the antenna 21A; plane waves 25A and 25B are formed in an upper right direction shown in FIG. 2. In addition, the radio waves 22A–22C and 24A–24C can be supplied in the same manner, in which case the antenna can emit radio waves having an identical directivity in two directions.

Through the aforementioned operation, the directivity of the directional antenna can be controlled.

Figure 3:
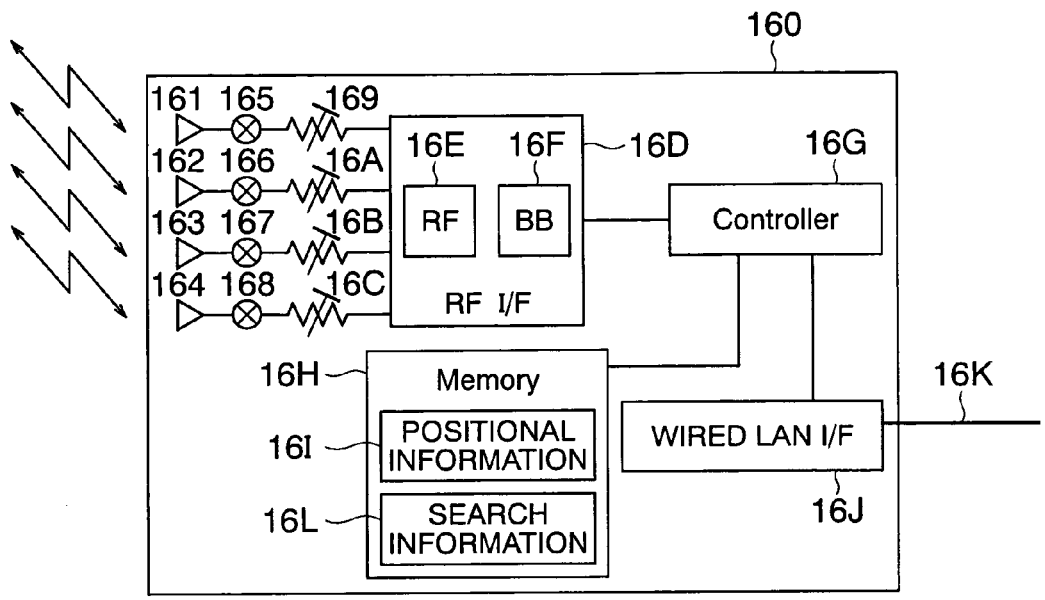
FIG. 3 is a block diagram of a structure of a radio base station in the present invention.

FIG. 3 is a block diagram of a structure of a radio base station in an embodiment of the present invention. In FIG. 3, reference numeral 160 denotes a radio base station, numerals 161 to 164 denote antenna elements, 165 to 168 denote phase adjusters, 169 and 16A to 16C denote attenuators, reference symbol 16D denotes an RF interface, symbol 16E denotes a radio frequency (RF) unit, 16F denotes a base band (BB) unit, 16G denotes a controller, 16H denotes a memory, 16I denotes positional information, 16J denotes a wired LAN interface, 16K denotes a wired LAN, and 16L denotes search information.

In the radio base station according to the embodiment of the present invention shown in FIG. 3, such a directional antenna as explained in FIGS. 1 and 2 is employed as an example. In the illustrated radio base station 160; the antenna elements 161 to 164 for outputting a radio signal, the phase adjusters 165 to 168, and the attenuators 169 and 16A–16C form a directional antenna. The RF interface 16D for providing an RF output to the directional antenna has the RF unit 16E and the BB unit 16F. The wired LAN interface 16J for performing data transfer with the wired LAN 16K is connected to the RF interface 16D by the controller 16G. The controller 16G is connected to the memory 16H for storing positional information about radio base stations, search information, etc. The memory 16H contains the positional information 16I and the wired LAN interface.

The electric field intensity of another radio base station obtained by the directional antenna including the antenna elements 161 to 164, phase adjusters 165 to 168, and attenuators 169, 16A–16C is sent to the controller 16G via the RF interface 16D. The controller 16G when receiving the electric field intensity, converts it to polar coordinate information relative to the radio base station, and stores the information in the memory 16H as the positional information 16I. When obtaining the positional information 16I via the wired LAN 16K, the controller 16G accepts a packet transmitted from another radio base station via the wired LAN interface 16J from the wired LAN 16K, converts the information to polar coordinate information relative to the radio base station, merges it with information included in the positional information 16I of the memory 16H of the radio base station, and again stores it in the memory 16H as the positional information 16I. The search information 16L indicates whether or not another radio base station is searching for its periphery. The search information 16L is a packet transmitted from the other radio base station. The packet is received from the wired LAN 16K via the wired LAN interface 16J and controller 16G, and then stored in the memory 16H as the search information 16L.

The radio base station arranged as mentioned above sets a usable channel and communicatable area on the basis of the found direction and distance of the other radio base station. At this time, the setting of the communicatable area is carried out by adjusting the power of a radio output, the reception sensitivity, and the directivity of the directional antenna.

Explanation will next be made in connection with an example wherein such a radio base station as mentioned above is used to search for its periphery and to set the radio base station.

Figure 4:
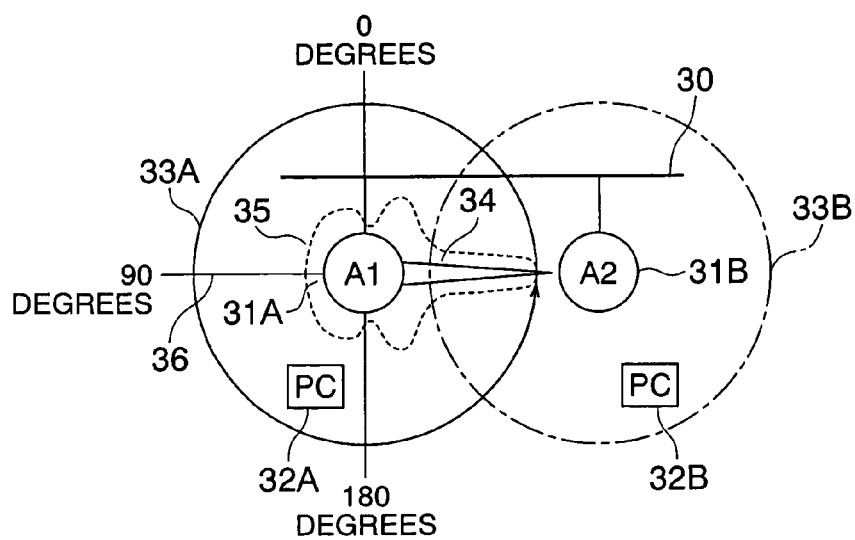
FIG. 4 is a basic configuration of a radio LAN using radio base stations in the present invention.

FIG. 4 shows a basic configuration of a radio LAN using radio base stations in accordance with the embodiment of the present invention. In FIG. 4, reference numeral 30 denotes a wired LAN, reference symbols 31A and 31B denote radio base stations, symbols 32A and 32B denote radio terminals, and 33A and 33B denote communicatable areas (cells).

The radio LAN shown in FIG. 4 is an example when the two radio base stations 31A and 31B are connected to the wired LAN 30. As shown in FIG. 4, the radio base stations 31A and 31B have the respective cells 33A and 33B in which the radio terminals 32A and 32B are wirelessly connected to the respective base stations. The radio base station 31A searches for the periphery of the radio base station 31A using a directional radio wave output 34 of the directional antenna. The searching, as already explained in FIG. 2, is carried out by radiating directional radio waves and detecting interference with radio waves from another radio base station while rotating the radiation direction, thereby searching for the other radio base station and the cell of the other radio base station to which the terminal belongs. The directional radio wave output 34 indicates an ideal output. In actuality, however, a directional radio wave output 35 as shown in FIG. 4 is used for the periphery searching. Thus, when the directivity spacing of the directional antenna can be adjusted in an angle of about 10 degrees, periphery searching commensurate with the directional radio wave output can be realized.

As shown in FIG. 4, as a result of the periphery searching, when it is determined that the cells 33A and 33B contain mutually different radio base stations, there is a possibility that radio wave interference may take place between the radio base stations.

Figure 5:
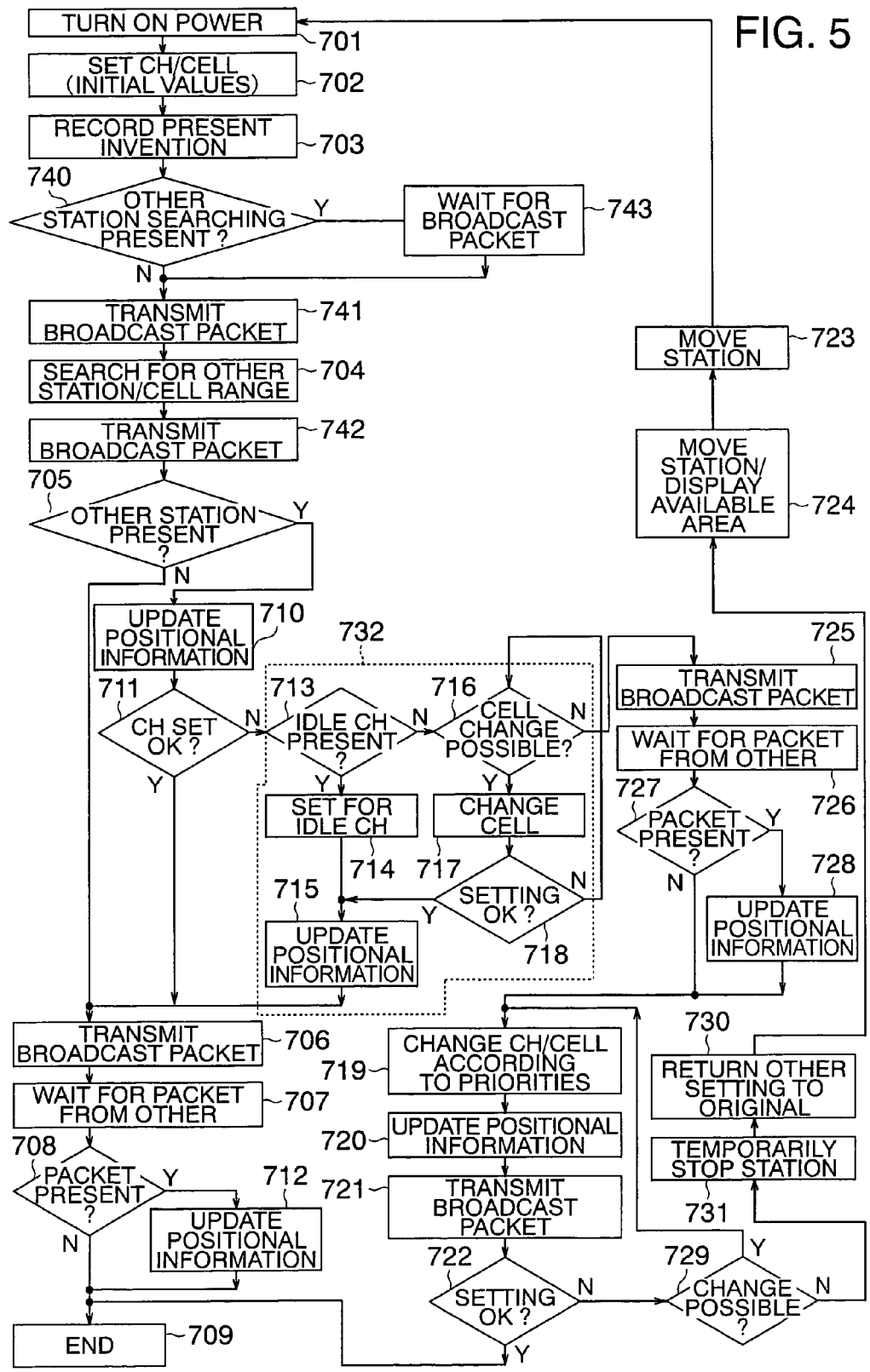
FIG. 5 is a flow chart for explaining an operational procedure to prevent radio wave interference.

FIG. 5 is a flow chart for explaining an operational procedure to prevent the radio wave interference as in the above case, which will next be explained. The flow chart of FIG. 5 is an operational example of how a new radio base station added in the wired LAN or another radio base station connected to the wired LAN automatically sets a cell and operating frequency.

(1) The newly added radio base station first starts the turning on of the power of its own station and the setting of initial values of channel and cell. In this case, the initial values are set without knowing the set information of another radio base station, and the radio base station starts its operation using the set initial values. Thus it is unnecessary to set the initial values, in particular, to limited values. However, it is desirable that radio wave output other than the periphery searching not be carried out until the settings of the newly added radio base station are completed to avoid influences on another radio base station (steps 701 and 702).

(2) The channel and cell information set as the initial values are recorded in a positional information storage area of the newly added radio base station, and it is necessary to perform periphery searching to know whether or not another radio base station is present in the cell of the newly added base station. Upon the periphery searching, when the other radio base station is performing periphery searching, the periphery searching may not be accurately carried out in some cases. For this reason, the radio base station in question confirms whether or not the other base station is performing periphery searching on the basis of the search information the base station concerned (steps 703 and 740).

(3) When the periphery searching operation of the other base station is already recorded in the search information on the basis of the confirming operation of the step 740, the base station in question waits for the transmission of a packet indicative of the completion of the periphery searching via the wired LAN from the other base station. After receiving the packet, the base station in question erases the search information, the base station in question erases the search information, transmits a packet indicative of starting of its own periphery searching to another radio base station connected to the wired LAN, and moves to the periphery searching (steps 743 and 741).

(4) The base station in question performs periphery-searching operation over all frequency bands (all channels) usable by the base station in question using the directivity of the directional antenna. After completing the periphery searching, the base station in question transmits a packet indicative of the completion of the periphery searching via the wired LAN to the other base station connected to the wired LAN (steps 704 and 742).

(5) On the basis of a result of the periphery searching of the step 704, the base station in question determines whether or not another radio base station or the cell thereof is present in the cell of the newly added base station. In the absence, the newly added base station completes the setting of its own channel and cell (step 705).

(6) Thereafter, the new base station is required to examine whether or not a radio base station is present outside the cell of its own base station. This is because the setting change and movement of the base station are carried out on the basis of all information of the base stations on the same wired LAN. Since the information is used to determine priority upon setting change or to determine the movable area of the base station, the newly added base station is required to get information about all the radio base stations. To this end, the newly added base station outputs a broadcast packet onto the wired LAN to inform all the radio base stations connected on the wired LAN of the fact that the base station is a newly added station. The new base station also outputs the positional information of the new base station together with the packet (step 706).

(7) When a radio base station is present outside the cell of the newly added base station, the broadcast packet accepted by the base station outside the cell via the wired LAN contains no information about the base station outside the cell, so that the base station outside the cell returns a packet containing its own positional information to the newly added base station via the wired LAN. Thus the new base station accepts the packet, converts the positional information of the outside-cell base station to positional information relative to the new base station, merges the converted information with its own positional information, and records the merged information in a positional information storage area. Through the above operation, the positional information of the newly added base station can be updated, so that the new base station can have positional information equivalent to that of the existing radio base station. When the channel change or cell change is not carried out, the new base station terminates its setting operation (steps 707, 708, 712 and 709).

(8) As a result of the judgment of the step 705, when the presence of another radio base station in the cell of the newly added base station is determined through searching in the cell of the new base station, the new base station adds the information indicative of the presence of another base station to the positional information of the new base station, and confirms whether or not the positional information causes a problem with the channel setting of the new base station. In the absence of a problem, control goes to the operations of the above step 706 and subsequent steps. The determination of no problem with the channel setting is based on, e.g., the IEEE802.11b standard, that is, whether or not the channel of the new base station is spaced by two channels or more from the channel of the base station present in the same cell as its judgment criterion, because, in a radio LAN based on the standard, spacing of two channels or more between radio base stations causes no interference therebetween. In a radio LAN based on the IEEE802.11a standard, the above determination is based on the IEEE802.11a standard, that is, whether or not the channel of the new base station is overlapped with the channel of the radio base station located in the same cell as its judgment criterion, because channel spacing is not required in the radio LAN based on the IEEE802.11a standard. Even for settings other than the channel setting, the quality of channel can be used as the aforementioned judgment criterion. For example, when signal/noise ratio can be used as a rule of thumb. Generally, when 20 dB or more of signal/noise ratio is secured, a problem with the quality will not be caused based on a quality criterion (steps 710 and 711).

(9) When the presence of a problem with the channel setting is confirmed in the step 711 with the aforementioned judgment criterion, the presence or absence of an idle channel is determined on the basis of the positional information of the new base stations. In the presence of an idle channel in the positional information of the new base station, the idle channel is set to the new base station, the positional information of the new base station is updated, and then control goes to the step 706 and subsequent steps (steps 713, 714 and 715).

(10) When the absence of an idle channel is determined in the judgment of the step 713 on the basis of the positional information of the new base station, it is judged on the basis of the positional information of the new base station whether or not the cell setting can be changed. If the cell setting change is possible, then the cell setting of the new base station is changed. The judgment of whether or not the cell setting can be changed is based on the cell area of the other base station in the positional information as its judgment criterion. When the base station in question is in the cell of the other base station, even the change of the cell setting will not lead to the improved conditions. Thus it is determined that the cell change is impossible in this case. When the base station in question is not in the cell of the other base station, the judgment criterion is whether the directivity of the base station in question can be changed, the output radio wave interference can be adjusted, or the reception sensitivity can be adjusted. When the cell setting is changed with the above judgment criterion, whether or not the cell setting is good is judged on the basis of the signal quality or the like. When the setting is good, control proceeds to the step 715 and subsequent steps (steps 716s, 717 and 718).

(11) When bad cell setting is determined as the judgment of the step 718, it is judged whether or not the cell setting of the new base station can be changed. If the change is possible, then the same operational flow is again carried out. When the setting is not good even after the cell change of the new base station was done, the new base station informs the other base station of the fact that the setting of the new base station is not good. To this end, the new base station transmits a broadcast packet indicative of the fact to the other base station via the wired LAN. At this time, when the other base station is present outside the cell of the new base station, the new base station receives a packet from the other base station as a replay, converts the positional information of the base station outside the cell to positional information relative to the new base station, merges the converted information with its own positional information, and records the merged information in the positional information storage area (steps 725 to 728).

(12) In the aforementioned processing operations, the newly added radio base station have tried to set its own base station by itself and has not changed the setting of the other base station. However, when the newly added base station cannot change the setting only by itself, the setting change is carried out for all the radio base stations present in the same wired LAN. To this end, all the radio base stations change the channel and cell settings in an descending order of the priorities of the setting change on the basis of the positional information (step 719).

(13) The radio base station which changed the channel or cell, updates the positional information of its own base station, and also transmits this information to another base station as a broadcast packet. And all the radio base stations judge whether or not the setting causes no problem. If it causes no problem, then the setting operation is terminated (steps 720 to 722 and 709).

(14) When it is determined in the judgment of the step 722 that the channel or cell setting created a problem, it is judged whether or not the channel or cell can be further changed. If the change is possible, then control goes to the steps 719 to 722 to repetitively execute the operations of the steps (step 729).

(15) When the setting change cannot be further done in the judgment of the step 729, the newly added base station stops its operation, and the setting of the other base station is returned to the state before the new base station is added (steps 731 and 730).

(16) The new base station, during stoppage of the own station, confirms the positional information of the radio base station connected to the wired LAN from a radio terminal wirelessly connected to the other base station, keeps track of an area in which its own base station can be added, moves the radio base station, and again repeats the operations of the step 701 and subsequent steps (steps 724 and 723).

In the processing operations of the foregoing embodiment of the present invention, the change of the channel and cell settings in the newly added base station has been most preferentially carried out. In the present invention, however, the optimum settings of all the radio base stations can be realized from the beginning. In this case, when it is desired to change the channel setting after the judgment of the step 711 for the channel setting of the new base station control may go to the operations of the step 735 and subsequent steps without executing the operation of the step 732 surrounded by a dotted line in the drawing.

Figure 6:
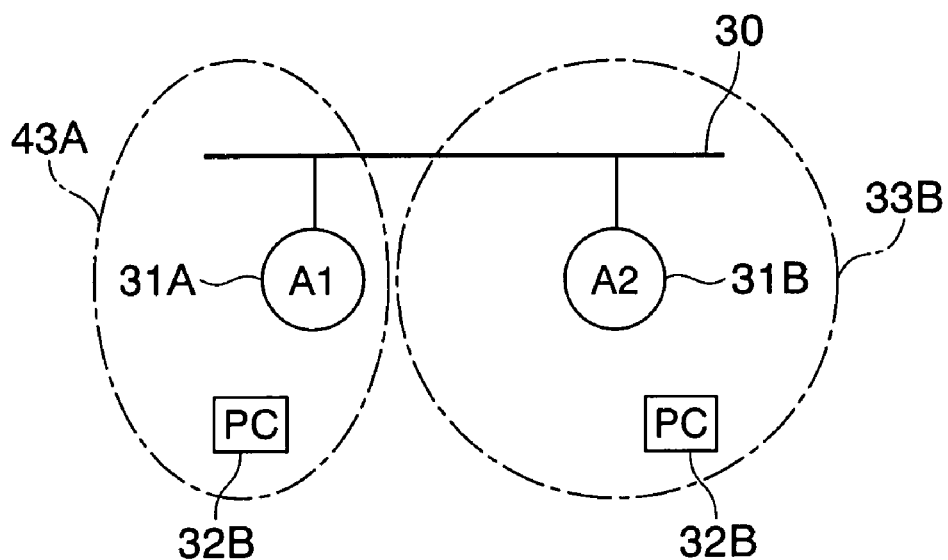
FIG. 6 is a diagram for explaining an example when a base station 31A is moved from a cell 33A to a cell 43A.
Figure 7:
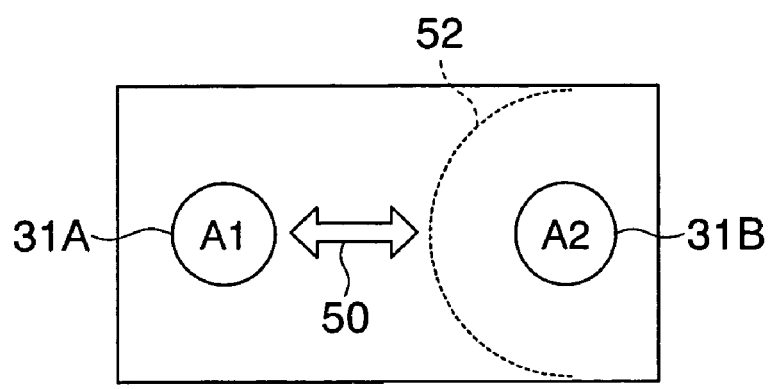
FIG. 7 shows a relative positional relationship between radio base stations.
Figures 8, 9:
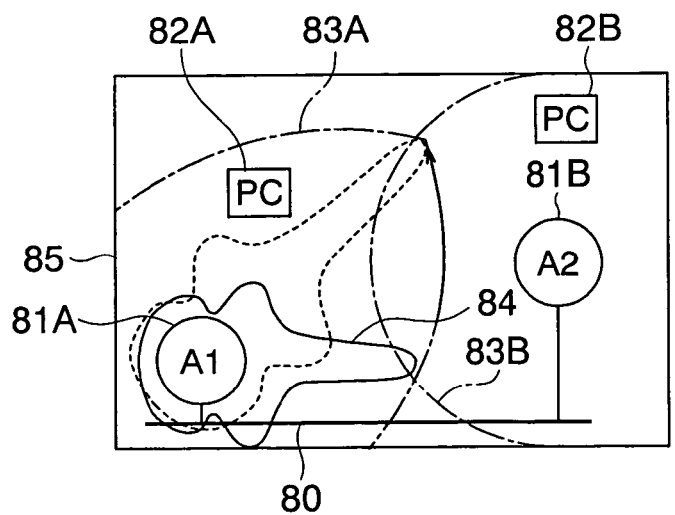
FIG. 8 is a table for explaining set information about respective radio base stations.
FIG. 9 is a diagram for explaining an example when the cell range of the radio base station is varied with its surrounding environment.

FIG. 6 is a diagram for explaining an example when the radio base station 31A shown in FIG. 4 is changed from the cell 33A to the cell 43A through the aforementioned operations of the flow chart of FIG. 5, FIG. 7 shows a relative positional relationship between radio base stations, and FIG. 8 is a table for explaining information set for radio base stations.

In the example explained in FIG. 4, the cells 33A and 33B of the radio base stations 31A and 31B connected to the wired LAN 30 have been overlapped with each other. The example of FIG. 6 shows when the radio base station 31A is changed from the cell 33A to the cell 43A as a result of the processing operation explained in FIG. 5 on the basis of periphery information searched for by the radio base station 31A. As will be seen from the example of FIG. 6, through the operations explained in FIG. 5, a cell area having no interference area can be formed.

An example of positional information for realizing such change of the cell area as mentioned above is shown in FIGS. 7 and 8. As in the case of the radio base station 31A explained in FIG. 4, the relative positional relationship between the radio base stations shown in FIG. 7 can be formed on the basis of data obtained by changing the directivity of the directional antenna and performing periphery searching operation. The data includes a spatial relative position of the radio base station 31B when viewed from the radio base station 31A as a reference, and information 50 indicative of an overlap between the cell 52 of the radio base station 31B with a specific radio wave intensity as a reference when viewed from the radio base station 31A and the cell of the radio base station 31A having the initial set values.

Set information for each radio base station, as shown in FIG. 8, has a set channel, a signal/noise ratio indicative of the quality of the set channel, a frame error rate, etc. The set information also has the number of radio base stations included in the cell of each radio base station, the set channel, possession or non-possession of the directivity adjusting function, set cell information, etc. Using such information, the setting priority for each base station when changing the cell or channel can be determined, and repetition of re-setting upon automatic cell or channel setting can be avoided. Further, when the set information is set to have the quality of a non-set channel when viewed from each radio base station, the accuracy of the cell or channel setting can be further increased.

In the example of FIG. 8, there are recorded in the table that a radio LAN has two base stations A1 and A2, the base stations both use channel 1, signal/noise ratio and frame error rate are given for each base station, and two radio base stations in total are viewed from each base station. Also recorded in the table is the fact that channel (CH) 1 is used by the two base stations and channels 2 to 4 are not used by any base station. Further, the table indicates that the radio base station A1 has a directional antenna, the level of change of the cell setting of the station A1 is "middle", and the radio base station A2 has no directional antenna. In addition, a signal/noise ratio and a frame error rate when another channel is used, can be recorded as the states of the other channel in the set information.

Figure 10:
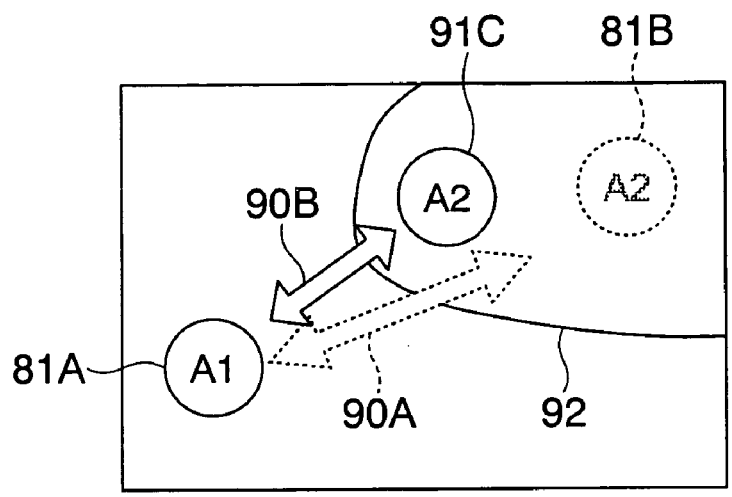
FIG. 10 is a diagram for explaining positional information obtained when the cell range of the radio base station was varied with its surrounding environment.

FIG. 9 is a diagram for explaining an example when the cell range of a radio base station is varied with its surrounding environment, and FIG. 10 is a diagram for explaining positional information obtained when the cell range of the radio base station was varied with its surrounding environment. Explanation will then be made in connection with an example when the cell shape is changed with the surrounding environment, by referring to FIGS. 9 and 10.

FIG. 9 shows an example when the cell range varies with the surrounding environment, wherein two radio base stations 81A and 81B are connected to a wired LAN 80. In the illustrated example, even when each base station controls its antenna so as to form a circular cell, only the cell 83A of the radio base station 81A among the cells 83A and 83B of the stations 81A and 81B is varied with the surrounding environment. When the radio base station 81A performs its periphery searching operation, a directional radio wave output 84 of the directional antenna of the radio base station 81A is used to search for the periphery of the radio base station 81A along the deformed shape.

Positional information obtained by the above searching operation is given in FIG. 10 and is obtained by the radio base station 81A searching with use of the directional radio wave output 84 of the directional antenna in FIG. 9. A positional relationship between the radio base stations A1 and A2 is the same as the positional relationship between the radio base stations 81A and 81B in FIG. 9 when the base stations are not influenced by the surrounding environment. However, since the influence of the surrounding environment caused the directional radio wave output 84 of the directional antenna to be deformed in FIG. 9, the position of the radio base station A2 is recorded as a shifted position like a radio base station 91C. Further, the cell range of the radio base station 91C, when the specific radio wave intensity of the radio base station 91C is used as a reference, is also deformed as shown by a cell 92. As mentioned above, the important factor necessary for realizing the optimum cell setting of the radio base station is that the positional information of the base station including the influence of the surrounding environment can be created, that is, the characteristics of the radio base station in a practical application can be taken into consideration.

Figure 11:
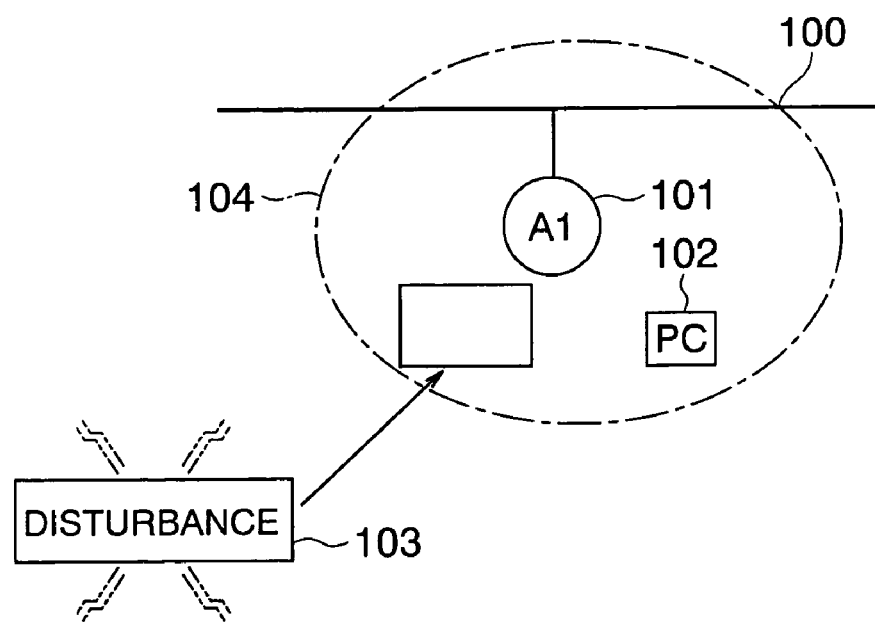
FIG. 11 is a diagram for explaining an example when external interference took place after channel setting.

FIG. 11 is a diagram for explaining an example when external interference took place after channel setting.

In the example to be now explained, it is assumed that a radio base station 101 is connected to a wired LAN 100, and a wirelessly-connectable radio terminal 102 is present in a cell 104 of the radio base station 101. Assume that external noise 103 enters the range of the cell 104 of the radio base station 101 to cause generation of radio waves having the same frequency band as radio waves used by the radio base station. Then the radio base station 101 is subject to interference by the external noise 103.

When the external noise 103 enters the cell as mentioned above, in order to avoid the interference by the external noise, switching between the channel settings or cell settings becomes necessary.

Figure 12:
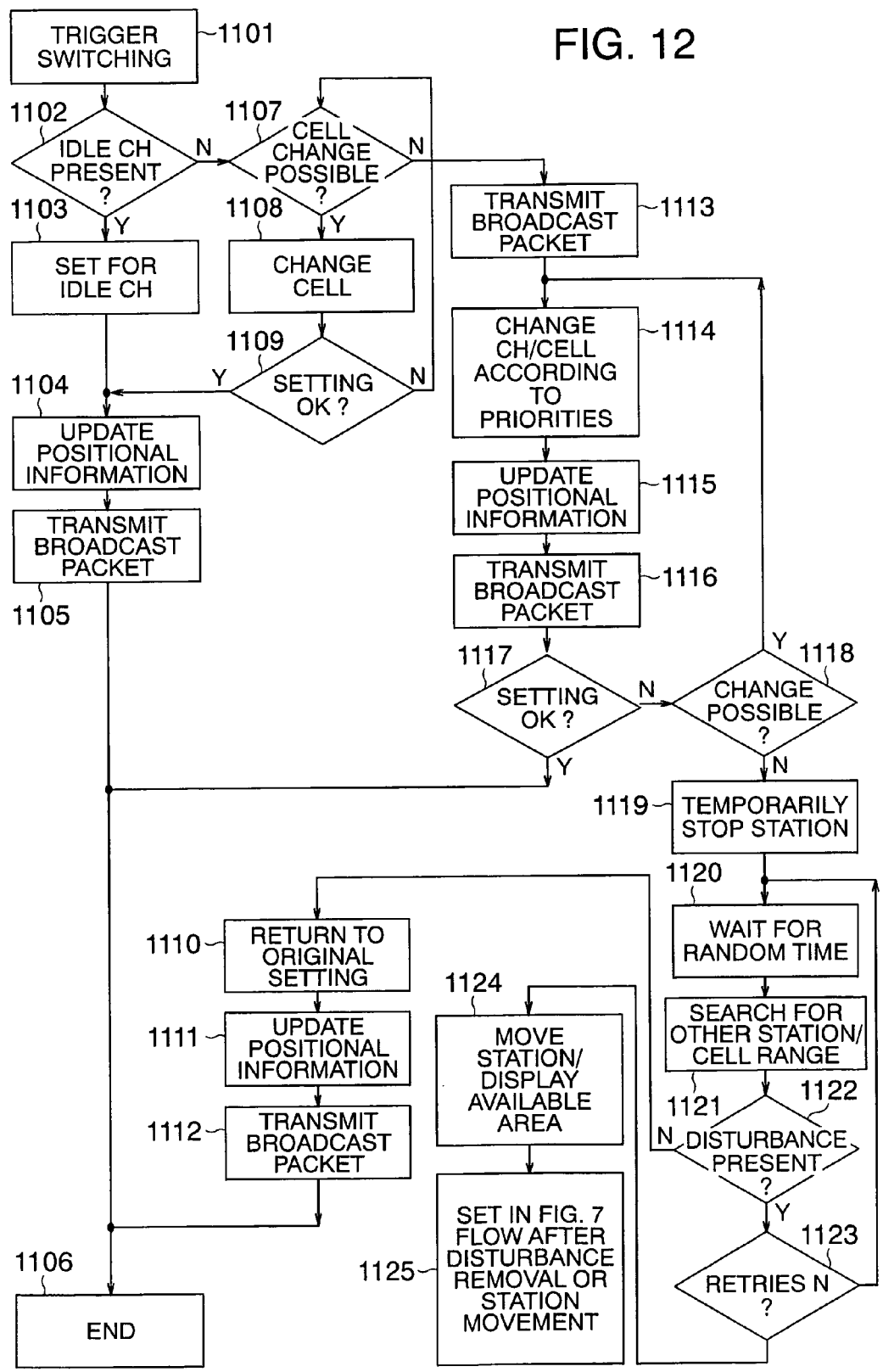
FIG. 12 is a flow chart for explaining processing operation when channel and cell setting is changed during operation of a radio base station due to occurrence of interference after channel setting.

FIG. 12 is a flow chart for explaining the processing operations when the channel or cell setting is changed during operation of a radio base station at the time of occurrence of interference after the channel setting, which will next be explained.

(1) As already explained in FIG. 11, when a radio base station is externally subject to interference, switching between channel settings or cell settings is required. For this reason, the base station starts its operation as a trigger when subject to interference (step 1101).

(2) The interfered base station searches for a settable empty or idle channel on the basis of positional information to judge the presence or absence of an idle channel. When the base station determines the presence of a settable idle channel, idle channel is set for the interfered base station (steps 1102 and 1103).

(3) And the interfered base station updates positional information therein, transmits the updated positional information to another radio base station via a wired LAN as a broadcast packet, and terminates its setting operation (steps 1104 to 1106).

(4) When the absence of a settable idle channel in the interfered base station is determined as a result of the judgment of the step 1102, the interfered base station judges whether or not its cell setting can be changed on the basis of the positional information of the interfered base station. When the cell setting can be changed, the base station changes the cell and judges whether or not the changed cell setting was good (steps 1107 to 1109).

(5) When the base station determines that the changed cell setting was good as a result of the judgment of the step 1109, control proceeds to the aforementioned step 1104 and subsequent steps. When the base station determines that the changed cell setting was not good, on the other hand, control returns to the step 1107 and subsequent steps to judge whether or not the cell setting can be again changed. When the cell setting can be changed, the base station again repeats the operations of the subsequent steps.

(6) When the cell setting is changed in its changeable cell range of the interfered radio base station in the judgment of the step 1107 but ends in an unsuccessful result, the interfered base station transmits a broadcast packet indicative of the unsuccessful result to the other radio base station via the wired LAN to inform the other base station of the unsuccessful result (step 1113).

(7) In the processing operations mentioned so far, only the interfered base station tried to performs its own setting and did not change the setting of the other base station. However, when the setting cannot be carried out only by the interfered base station, setting change is carried out for all the base stations present on the same wired LAN. To this end, all the base stations change their channel or cell settings in the descending order of priorities of the setting change of the base stations on the basis of their positional information (step 1114).

(8) The base station, which changed the channel or cell settings, updates the positional information of its own station, and transmits the updated information to another base station via the wired LAN as a broadcast packet. And the base station judges whether or not the setting change leads to a trouble. In the case of no trouble, the base station terminates its setting operation (steps 1114 to 1117).

(9) When determining in the judgment of the step 1117 that the channel or cell setting involved a problem, the base station judges whether or not the channel or cell can be further changed. If the further change is possible, then the base station repetitively executes the operations of the steps 1114 to 1117 (step 1118).

(10) When the setting change cannot be carried out in the judgment of the step 1118, the operation of the interfered base station is temporarily stopped. After waiting for passage of a randomly set time, the base station searches the interfered base station for a cell range and judges the still presence or absence of the disturbance which became a switching trigger in the interfered station (steps 1119 to 1122).

(11) When it is determined in the step 1122 that the disturbance disappeared, the base station returns the settings of all the radio base stations to the states before the switching trigger, returns the positional information to the initial information, transmits information indicative of the fact to the other base stations via the wired LAN as a broadcast packet, and terminates its setting operation (steps 1110 to 1112 and 1106).

(12) When the still presence of the disturbance in the cell range of the interfered base station is determined in the step 1122, the base station judges whether or not the operation subsequent to the random time wait was retried by a specified frequency. If the frequency fails to reach the specified value, then control returns to the operations of the step 1120 and subsequent steps to repeat the operations (step 1123).

(13) When it is determined in the step 1123 that the frequency reached the specified retry value, the interfered base station confirms the positional information of the base station connected to the wired LAN from a radio terminal wirelessly connected to the other base station, grasps an area newly addable to its own base station, and moves the base station. Thereafter the setting is carried out through the operations explained in FIG. 5 (steps 1124 and 1125).

The above example has been explained in connection with the case where the radio base station was subject to a disturbance as a switching trigger. However, even when the installation position of the radio base station was moved during its operation, the setting change is similarly required. To this end, in the present invention, the radio base station previously incorporates a gyroscope, a terrestrial magnetism sensor, a vibration sensor, etc., so that the base station can also change its setting on the basis of a detection signal of such a sensor.

Figure 13:
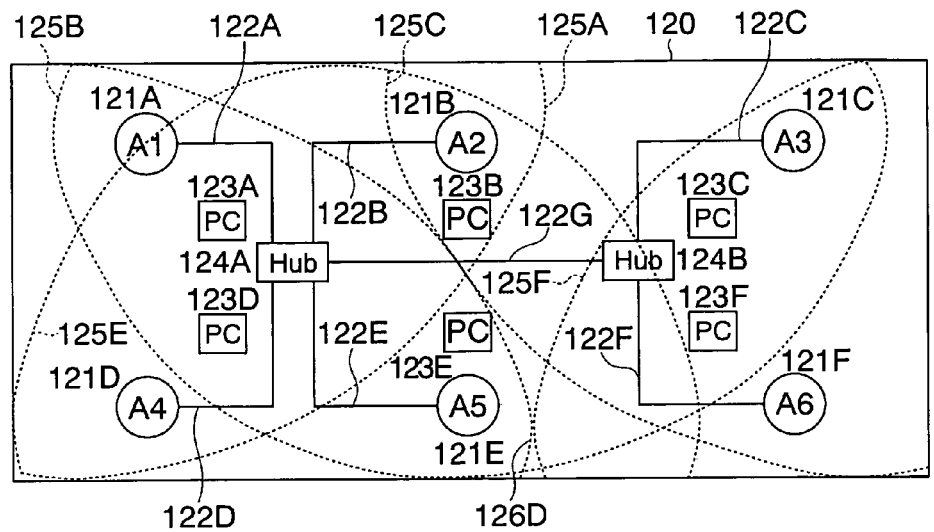
FIG. 13 shows a configuration of a radio LAN system when many base station are positioned in a wired LAN.

FIG. 13 is a block diagram of a system configuration of a radio LAN when many radio base stations are arranged to be connected to a wired LAN.

In FIG. 13, six radio base stations 121A to 121F are arranged in a radio base station installation area 120. The radio base station 121A is connected to a hub 124A by a wired LAN 122A, the radio base station 121B is connected to a hub 124A by a wired LAN 122B, the radio base station 121C is connected to a hub 124B by a wired LAN 122C, the radio base station 121D is connected to the hub 124A by a wired LAN 122D, the radio base station 121E is connected to the hub 124A by a wired LAN 122E, and the radio base station 121F is connected to the hub 124B by the wired LAN 122E.

And the hub 124A and hub 124B are connected by a wired LAN 122G. A wirelessly connectable radio terminal is present for each of the radio base stations. More specifically, a radio terminal 123A is connected to the radio base station 121A, a radio terminal 123B is connected to the radio base station 121B, a radio terminal 123C is connected to the radio base station 121C, a radio terminal 123D is connected to the radio base station 121D, a radio terminal 123E is connected to the radio base station 121E, and a radio terminal 123F is connected to the radio base station 121F, respectively.

With the layout as mentioned above, the radio base station 121A has a cell range 125A, the radio base station 121B has a cell range 125B, the radio base station 121C has a cell range 125C, the radio base station 121D has a cell range 125D, the radio base station 121E has a cell range 125E, and the radio base station 121F has a cell range 125F, respectively.

Figure 14:
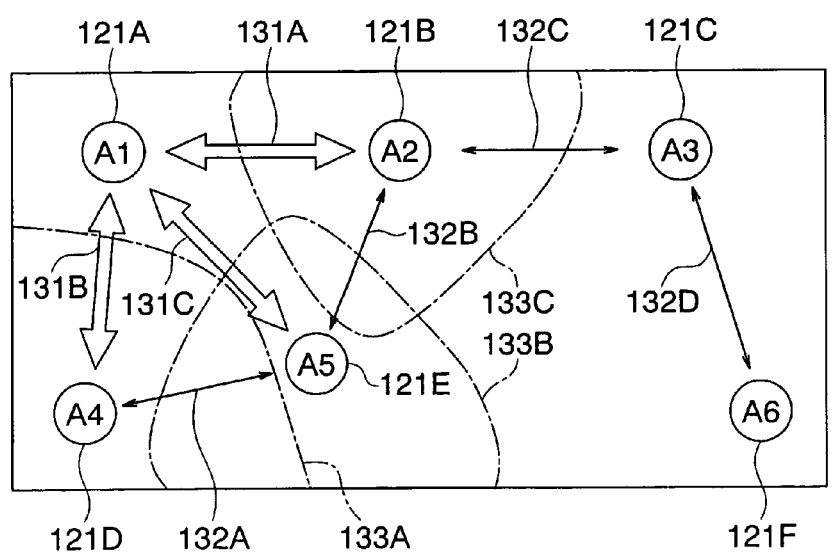
FIG. 14 shows a positional relationship of a radio base station A1 with other radio base stations in the example of FIG. 13.
Figures 15, 16:
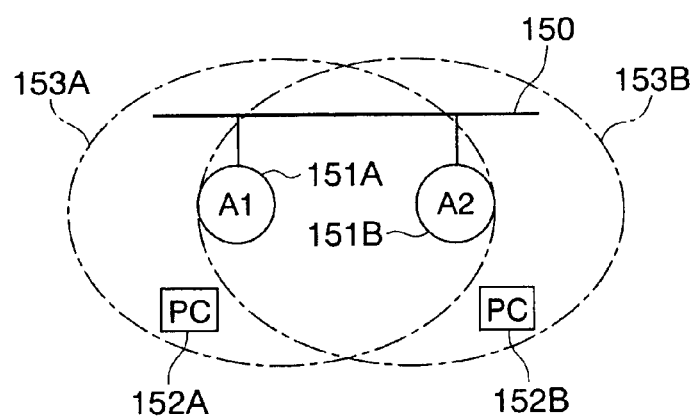
FIG. 15 is a table for numerically explaining set information about radio base stations.
FIG. 16 is a diagram for explaining how to set operating frequency of a radio base station in a radio LAN in the prior art.

FIG. 14 shows a positional relationship of the radio base station A1 (121A) with the other radio base stations in the example of FIG. 13, and FIG. 15 is a table for numerically explaining information set for the respective radio base stations.

Positional information shown in FIG. 14 indicates the positional relationship of the radio base station A1 with the other radio base stations. That is, arrows of 131A, 131B and 131C indicate radio base stations having cell ranges overlapped with the cell range of the radio base station 121A. Arrows 132A to 132D indicate mutually overlapped cell ranges of radio base stations other than the cell range of the radio base station 121A. Symbols 133A to 133C indicate cell ranges of the radio base stations 121B, 121D and 121E obtained based on the result of searching for the peripheral radio environment of the radio base station 121A using the directivity of the directional antenna of the radio base station 121A.

The six radio base stations are located with an equal spacing of a physical distance therebetween as shown in FIG. 13. In a radio space, however, as shown in FIG. 14, the periphery of the radio base station 121A has a high wave density, whereas, the periphery of the radio base station 121F has a low wave density. In this way, the radio characteristic of each base station may vary from base station to base station.

FIG. 15 numerically shows the set information of the aforementioned radio base stations. The shown numerical values as the set information of each of the radio base stations indicate the set channel, the signal/noise ratio indicative of the peripheral environment of the base station, the frame error rate, etc. The set information also contain the number of radio base stations connected in the cell range of each base station as a rule of thumb indicative of the peripheral environment of the base station. The information further contain the presence or absence of a variable directivity function, the cell set state, and the states of the other channels. On the basis of the above data, the priority is set when the setting is changed.

The operations in the embodiment of the present invention can be implemented in the form of the execution of a computer program, and the computer program can be provided as a program stored in a recording medium such as HD, DAT, FD, MO, DVD-ROM, CD-ROM or the like and can be provided from a network.

In the foregoing embodiment of the present invention, the operational explanation has been made in connection with the example wherein the radio base stations are connected to the wired LAN. However, the present invention may be applied even to a radio base station not connected to a wired LAN to search for other radio base stations and to automatically set the cell or frequency of the base stations.

In accordance with the foregoing embodiment of the present invention, there is provided a radio base station which can minimize interference between radio base stations and also a method for automatically setting a communicatable area of the base station. Further, even when the radio base station was subject to interference from a radio terminal connected to the base station, when external noise abruptly occurred, or when the radio base station was moved; the channel or cell setting can be changed quickly and optimumly.

As has been explained in the foregoing, in accordance with the present invention, interference between the radio base stations forming the radio LAN can be minimized. And, even when the radio base station was subject to interference from the radio terminal connected to the base station, when external noise abruptly occurred, or when the radio base station was moved; the channel or cell setting can be changed quickly and optimumly.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A radio base station for wirelessly communicating with a radio terminal, comprising:
   a radio communication unit for wirelessly communicating with said radio terminal;
   an antenna for transmitting or receiving radio waves with a directivity;
   a controller for changing the directivity of said antenna, detecting a state of radio waves emitted from another radio base station, and setting a communication area of the concerned radio base station on the basis of the detected radio wave state;
   means for detecting an electric field intensity of radio waves transmitted from another radio base station;
   means for converting the detected electric field intensity to a distance;
   means for finding a relative direction and distance of the other radio base station with respect to the concerned radio base station; and
   a positional information memory for storing a position of the other radio base station.

2. The radio base station according to claim 1, wherein said positional information memory stores a polar coordinate of the other radio base station with respect to the concerned radio base station.

3. The radio base station according to claim 1, wherein said controller sets a communication area of the concerned radio base station by adjusting a power of a radio wave output of said antenna, a reception sensitivity thereof, and a directivity thereof.

4. The radio base station according to claim 1, wherein said controller searches for a communicatable area of another radio base station other than the concerned radio base station, and when there is a radio base station whose radio waves interfere with radio waves used by the concerned radio base station, for setting the communication area of the radio waves of the concerned radio base station so that the radio wave interference is minimized, or for assigning the radio waves to a channel different from said other radio base station.

5. The radio base station according to claim 4, wherein said controller changes the setting of the communicatable area of the concerned radio base station or a radio channel to be used when a radio base station was added, when the radio base station was subject to radio wave interference by external noise, or when a position of the radio base station was moved.

6. The radio base station according to claim 4, wherein said controller has means for detecting a movement of the concerned base station, and changes the setting of the communicatable area of the concerned base station or a radio channel to be used.

7. The radio base station according to claim 4, wherein said controller has a search information memory for storing search information indicative of whether or not another radio base station other than the concerned base station is searching for a communicatable area, and searches for the communicatable area of the other base station when the other base station is not searching for the communicatable area.

8. A radio base station for wirelessly communicating with a radio terminal, comprising:
   communication means for connecting the concerned radio base station with a radio base station other than the concerned base station;
   a radio communication unit for wirelessly communicating with said radio terminal;
   an antenna for transmitting and receiving radio waves with a directivity; and
   a controller for changing the directivity of said antenna, detecting a state of radio waves transmitted by the other radio base station, and setting a communication area and positional information of the concerned base station on the basis of said radio wave state,
   wherein the concerned base station informs the other base station of the positional information of the concerned base station,
   wherein said communication means receives the positional information of the other radio base station other than the concerned base station, and said controller sets the communication area and positional information of the concerned base station on the basis of a result obtained by searching for the communicatable area of the other base station other than the concerned base station and the positional information of the other base station.

9. The radio base station according to claim 8, wherein said communication means is a wired LAN.

10. The radio base station according to claim 8, wherein said controller searches for the communicatable area of the other base station other than the concerned base station, and, when there was a radio base station uses radio waves interfering with radio waves used by the concerned base station, sets the communication area of radio waves of the concerned base station so as to minimize the radio wave interference or changes radio waves to be assigned to a channel different from that of the other base station.

11. A method for controlling a radio base station for wirelessly communicating with a terminal, comprising the steps of:

detecting a state of radio waves transmitted by another radio base station by changing a directivity of an antenna of the radio base station;

setting the concerned base station to have the same radio frequency band as the other base station or setting the concerned base station to have a radio wave band different from the other base station according to the state of radio waves of the other base station;

finding positional information of the concerned base station on the basis of the detected radio wave state of the other base station and setting a communicatable area for the concerned base station;

receiving positional information of the other base station from the other base station;

generating positional information relative to the concerned base station on the basis of the received positional information of the other base station and the radio wave state transmitted by the other base station; and setting a directivity, a radio output intensity and a reception sensitivity for the concerned base station on the basis of the positional information of the base station.

12. The method according to claim 11, further comprising the step:

changing a communicatable area of the other base station when setting of a communicatable area for the concerned base station failed.

13. The method according to claim 11, further comprising the step of:

judging whether or not the other base station detects the radio state, and wherein the detection of the radio wave state of the other base station is carried out when the other base station is not in a similar searching operation.

14. The method according to claim 11, further comprising the steps of:

searching for said peripheral radio base station, finding initial positional information of the new base station, and setting a communicatable area for the new base station; and informing another radio base station other than the new base station of said initial positional information.

15. The method according to claim 14, wherein mid periphery searching of the radio base station is carried out when the other radio base station is not in a periphery searching operation.

16. The method according to claim 11, further comprising the steps of:

when the concerned radio base station was subject to radio wave interference by external nose, searching for said peripheral base station, finding positional information of the base station, and setting a communicatable area for the concerned base station; and informing the other base station other than the concerned base station of the positional information of the concerned base station.

17. The method according to claim 11, further comprising the steps of:

detecting a movement of the concerned base station;

when said movement was detected, searching for said peripheral radio base station, finding positional information of the base station, and setting a communicatable area for the base station; and informing the other radio base station other than the concerned base station of said initial positional information.

* * * * *